US009560549B2

(12) United States Patent
Speicher et al.

(10) Patent No.: US 9,560,549 B2
(45) Date of Patent: Jan. 31, 2017

(54) REPORTING OF AGGREGATED RAN CONGESTION INFORMATION

(71) Applicant: Cisco Technology, Inc., San Jose, CA (US)

(72) Inventors: Sebastian Speicher, Wallisellen (CH); Nirav Salot, Pune (IN); Maulik Vaidya, Alpharetta, GA (US); Amit Ghadge, Pune (IN); Veena Ramamoorthy, Marthahalli Bangalore (IN); Aeneas Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/478,964

(22) Filed: Sep. 5, 2014

(65) Prior Publication Data

US 2016/0073282 A1    Mar. 10, 2016

(51) Int. Cl.
*H04W 28/12* (2009.01)
*H04W 28/02* (2009.01)
*H04L 12/891* (2013.01)
*H04W 28/16* (2009.01)

(52) U.S. Cl.
CPC ......... *H04W 28/0284* (2013.01); *H04L 47/41* (2013.01); *H04W 28/12* (2013.01); *H04W 28/16* (2013.01)

(58) Field of Classification Search
CPC .................... H04W 28/16; H04W 28/0215
USPC ......................................................... 370/230
See application file for complete search history.

(56) References Cited

U.S. PATENT DOCUMENTS 8,724,467 B2 * 5/2014 Le Faucheur ........... H04L 47/11
370/235
2015/0382230 A1 * 12/2015 Miklos .............. H04W 28/0247
370/230

* cited by examiner

*Primary Examiner* — Mohammad Anwar
*Assistant Examiner* — Kokou R Detse
(74) *Attorney, Agent, or Firm* — Patent Capital Group

(57) ABSTRACT

The present disclosure is directed at systems, methods and media for relieving RAN congestion in a core network. In some embodiments, RAN congestion information is reported from user equipment to a packet data gateway (PGW) through an eNodeB and a software gateway. The PGW can aggregate the RAN congestion information and periodically notify other network nodes, for example, a PCRF, about the aggregate congestion in a network. By aggregating RAN congestion information, the PGW can substantially reduce the signaling required to report RAN congestion in the core network.

21 Claims, 9 Drawing Sheets

REPORTING OF AGGREGATED RAN CONGESTION INFORMATION

FIELD OF THE DISCLOSURE

This disclosure relates generally to systems, methods, and media for providing congestion information services in wireless network communications.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many user equipment, including, for example, satellite communications systems, portable digital assistants (PDAs), laptop computers, and mobile devices (e.g., cellular telephones). One benefit that users of such devices can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, typically do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

Networking architectures, particularly in mobile wireless communication environments, have grown increasingly complex. Data traffic has grown extensively in recent years, which has significantly increased the demands on network resources. As the number of mobile subscribers increases, efficient management of communication resources becomes even more critical. In some instances, the volume of subscribers communicating on a network may cause network equipment to be overwhelmed, provide suboptimal performance or create congestion in the network. Accordingly, there are significant challenges in managing network resources, particularly for crowded systems.

DETAILED DESCRIPTION

Overview

Figure 1:
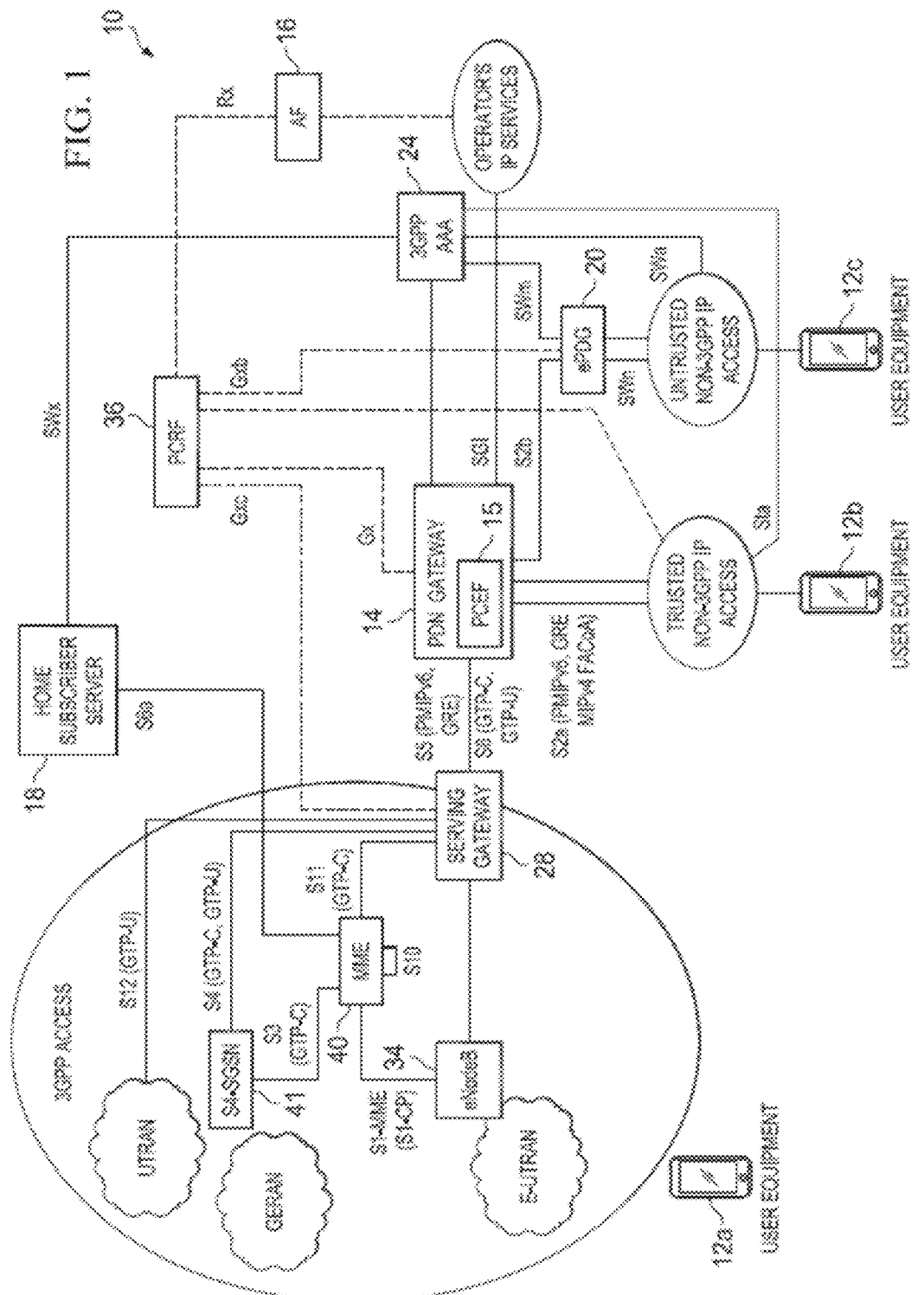
FIG. 1 is a schematic diagram showing the network nodes in an Evolved Packet Core (EPC) network, according to some embodiments.

In one embodiment, a network apparatus in a core network comprises one or more interfaces configured to communicate with user equipments (UEs) via a wireless network and to communicate with a policy charging rules function (PCRF) node and a processor in communication with the interface, the network apparatus configured to receive a first indication of congestion information related to a first user equipment (UE) during a time period, receive a second indication of congestion information relating to a second UE during that same time period, generate a message aggregating the congestion information comprising at least the first and second indications of congestion information, and send the message comprising the aggregated congestion information to the PCRF node over one of the interfaces. The network apparatus can be the PCRF node, wherein the PCRF node further sends the message to an Application Function (AF) node. The network apparatus can be the PCRF node, wherein the PCRF node further sends the message to a Traffic Detection Function (TDF) node. The message can comprises a Node-Info-Push message. The network apparatus can be a packet data network gateway (PGW) and the first and second indications can be received from one or more radio access networks. The network apparatus can collect congestion information for multiple UEs over a time period t. The apparatus can be configured to negotiate whether or not the network apparatus will aggregate the message prior to use. The aggregated congestion information can be piggybacked onto an existing message.

In one embodiment, a method for providing congestion information in a network system comprises a network apparatus in communication with multiple user equipments (UEs) via radio access networks (RANs) receiving a first indication of congestion information relating to a first UE, receiving a second indication of congestion information relating to a second UE, generating a message indicating aggregated congestion information including at least the first and second indications of congestion information, and sending the aggregated congestion information message to a policy charging rules function (PCRF) node. The message can be sent from the PCRF node to an Application Function (AF) node. The message can be sent from the PCRF node to a Traffic Detection Function (TDF) node. The message can comprise a Node-Info-Push message. The network apparatus can include a packet data network gateway (PGW) and receive information generated by RANs. The network apparatus can collect congestion information for multiple UEs over a time period t. The method can further comprise determining whether the network apparatus will aggregate the congestion information or provide separate messages for the first and second congestion information. The method can further comprise piggybacking the aggregated congestion information onto an existing another message.

In one embodiment, a method for relieving congestion in a network system can comprise receiving at a Policy Rules Charging Function (PCRF) node, from a Packet Data Network (PDN) gateway, a first message comprising congestion information, wherein the message comprises aggregated congestion information including at least a first indication of congestion information and a second indication of congestion information relating to first and a second user equipment (UE), generating a policy enforcement decision to relieve congestion in the network, and sending a second message to the PGW, wherein the second message comprises control message for relieving congestion in the network. The PCRF can forward the message to an Application Function (AF) node. The PCRF can forward the message to a Traffic Detection Function (TDF) node. The method can further comprise determining whether to receive congestion information relating to multiple UEs in aggregate form.

Description of Example Embodiments

An evolved packet core (EPC) network may include one or more cellular telephones or other mobile devices, called user equipment (UE); a radio transceiver/base station, called an eNodeB; a control node, called a mobile management entity (MME), which is responsible for tracking and paging the UE, as well as for selecting the serving gateway; a serving gateway (SGW), which routes and forwards user data packets and serves as a mobility anchor for the UE; and a packet data network gateway (PGW), which provides connectivity for the UE to external packet data networks and performs policy enforcement and charging (PCEF). As well, other network nodes, such as a home subscriber server/ authentication, authorization and accounting server (HSS/ AAA server) and a policy charging and rules function (PCRF) server, may serve additional functions. Through the PGW, the EPC connects to applications such as voice telephony or public Internet data service, which may reside on an IP Multimedia Subsystem (IMS) network or on another IP network. Although an EPC network with EPS bearers and PDN gateways is described below, other types of networks may be used to implement the congestion relief services described below. Such other networks can also include base stations and gateways and have a core network, and may specifically include 3G networks.

The evolved packet core may use a Radio Access Network (RAN), e.g., EUTRAN, to provide its physical layer. EUTRAN stands for the Evolved Universal Terrestrial Radio Access Network. The underlying air interface uses orthogonal frequency division multiple access (OFDMA) technology to provide higher data rates and lower latency, and is optimized for packetized data traffic. User equipment (UE) attaches to an evolved NodeB (eNodeB) to access the network. In doing so, the UE requests radio resources from the eNodeB to establish a radio bearer. This design allows substantial numbers of UEs to communicate with an eNodeB over a single physical channel (i.e., the radio waves carried over the air).

Because the RAN communicates via radio waves carried through the air, the RAN has a finite capacity to carry non-overlapping radio signals, limiting the total amount of data that can be transmitted at a particular time. UEs communicating over the RAN are further limited to communicating only over frequencies licensed to a carrier by the Federal Communications Commission (FCC). Due to these technical constraints, UEs attached to eNodeBs must compete for channel capacity for their communications. When the volume of data passing between UEs and an eNodeB reaches a threshold level, RAN may experience congestion. The threshold for congestion on a network may vary, but generally congestion exists when a plurality of UEs cannot communicate with an eNodeB simultaneously due to saturation of the RAN. Congestion on a RAN may lead to undesirable effects such as loss of data, higher latency, and dropped calls, significantly hindering overall network performance. Over time, congestion relief methods have been developed to address these issues.

One approach to alleviating RAN congestion is to increase a number of RAN base stations (e.g., eNodeBs) servicing a particular area. In this approach, a plurality of base stations, e.g., two base stations, are located in the area previously serviced by one base station. With more base stations in the same area, UEs may communicate, on average, over a shorter distance, allowing the UEs to reduce their power output. In this way, the number of devices communicating over the air without interference may be increased. Although this approach is commonly used as part of a long term strategy, eNodeB base stations can require years to plan and construct. In addition, new base stations are expensive. Thus, other methods focusing on alleviating short term congestion scenarios are necessary.

In another approach, a plurality of UEs connected to an eNodeB over a RAN may be assigned communication channels that overlap. In this approach, two UEs assigned to use overlapping channels may interfere with each other and cause signal loss. However, this approach takes advantage of the fact that UEs do not constantly transmit and receive data at their maximum capacity, but rather typically transmit data in bursts depending on whether a user is accessing the UE. This method of efficiently using channel resources is controlled by the main network, and it is most successful when usage is low. In this and other approaches, policy decisions about network resource usage are made at nodes within the core network and enforced across all network elements.

In general, eNodeB base stations do not process the signals they receive. Rather, eNodeBs provide the means to modulate and demodulate signals for communication across the RAN, and additionally to forward this data to the SGW. The SGW which serves as a portal to other elements of the network, providing a switch through which data can proceed. Data is then passed from the SGW to the PGW. The PGW controls routing of signals through the remainder of the network. As part of its normal operation in routing packets, the PGW constantly monitors UEs for their bandwidth utilization and compiles reports of RAN congestion. This information may then be passed from the PGW to the PCRF, AF, or TDF, each of which may make policy decisions regarding relief of RAN congestion in the network. In one approach, the PCRF, AF, or TDF may receive, for each UE, a report of congestion information for that UE from the PGW. Based on the reported congestion information for the individual UEs connected to a particular eNodeB, the PCRF, AF, or TDF may make policy decisions to alleviate the congestion. For example, the PCRF may force a UE to reduce its data rate, freeing signaling space for other UEs accessing the same node. In this approach, since congestion information is reported from the PGW to the PCRF separately for each UE, the underlying network can experience a signaling burden to draw conclusions about the RAN congestion at a given node. This signaling burden may reduce performance within the internal network.

In another approach, the burden on the underlying network may be reduced while ensuring sufficient signaling to make appropriate policy decisions at the PCRF or other network nodes. To reduce the volume of signaling required to reach policy conclusions, the PGW may not report RAN congestion information for each UE, but instead may aggregate the congestion information for a plurality of UEs to generate a generalized report regarding congestion at a particular node. This aggregated information may comprise a report of network resource utilization for a plurality of UEs during a given time period, e.g., resource utilization by the UEs over a period of 30 seconds. The PGW may then transmit the aggregated congestion report to the PCRF which can make policy decisions to reduce the congestion based on the aggregated information. Such a system can reduce the signaling burden on the network resources, reducing overall traffic in the EPC network. The PGW may be programmed to push the report of the aggregated congestion information to the PCRF at fixed time intervals. This message may be realized as a new message type, known as a Node-Info-Push message. Alternatively, the aggregated congestion information may be added to known message types within the system. In this embodiment, the PCRF, AF, and TDF may each subscribe to receive the aggregated congestion information reported in the node-info-push message from the PGW comprising the RAN congestion information.

FIG. 1 is a simplified block diagram illustrating a communication system 10 to facilitate reporting of RAN congestion information for a group of subscribers in a network environment according to one embodiment of the present disclosure. This particular configuration may be tied to the 3rd Generation Partnership Project (3GPP) Evolved Packet System (EPS) architecture, also sometimes referred to as the Long-term Evolution (LTE) EPS architecture. Alternatively, the depicted architecture may be applicable to other environments equally.

The example architecture of FIG. 1 may include multiple end users operating user equipment (UE) 12a-12c and packet data network (PDN) gateway (PGW) 14, which has a logical connection to a serving gateway (SGW) 28. Also provided are a home subscriber server (HSS) 18, an Authentication, Authorization and Accounting (AAA) element 24 and an S4 serving gateway support node (S4-SGSN) element 41. PGW 14 may include a Policy and Charging Enforcement Function (PCEF) 15. SGW 28 has a logical connection to an eNodeB 34 and a Mobility Management Entity (MME) 40. SGW 28 also has a logical connection to S4-SGSN 41. Both SGW 28 and PGW 14 can interface with a Policy and Charging Rules Function (PCRF) 36. An Application Function (AF) 16 may interface with the PCRF 36. As discussed herein, the terms 'user equipment,' 'user' and 'subscriber' are interchangeable.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In more general terms, 3GPP defines the Evolved Packet System (EPS) as specified in TS 23.060, TS 23.401, TS 23.203, TS 29.060, TS 29.212, TS 29.274, etc. The EPS generally consists of UE access networks and an Evolved Packet Core (EPC). Access networks may be 3GPP access networks including legacy access networks such as GSM EDGE Radio Access Network (GERAN), UMTS Terrestrial Radio Access Network (UTRAN) or LTE access networks such as Evolved UTRAN (E-UTRAN), or they may be non-3GPP IP access networks such as digital subscriber line (DSL), Cable, WiMAX, code division multiplex access (CDMA) 2000, or wireless LAN (e.g., Wi-Fi).

Non-3GPP IP access networks can be divided into trusted and untrusted segments. For the trusted segment, a viable relationship exists between a service provider and the core network. Trusted IP access networks support mobility, policy, and AAA interfaces to the EPC, whereas untrusted networks do not. Instead, access from untrusted access networks is done via an evolved packet data gateway (ePDG) 20, which provides for IPsec security associations to the user equipment over the untrusted IP access network. The ePDG has a logical connection to the PCRF 36 and supports mobility, policy and AAA interfaces to the EPC, similar to the trusted IP access networks.

Also provided in the architecture of FIG. 1 is a series of interfaces, which can offer mobility, policy control, AAA functions and/or charging activities (offline and online) for various network elements. For example, interfaces can be used to exchange point of attachment, location, and/or access data for one or more end users, for example, users operating UE 12a-12c. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include a Diameter protocol, service gateway interface (SGI), terminal access controller access-control system (TACACS), TACACS+, etc. RADIUS, Diameter and various interfaces related to communication for the protocols will be discussed in further detail below, as related to various embodiments of the present disclosure.

The EPC generally comprises an MME, an S4-SGSN, an SGW, a PGW (which may include a PCEF) and a PCRF. The components may be used to provide various UE services and/or functions and to implement QoS on packet flows. The services and functions may be used, for example, to provision voice over IP (VoIP) routing, enhanced services such as enhanced charging, stateful firewalls and/or traffic performance optimization (TPO). The MME is the primary control element for the EPC. Among other things, the MME provides for UE tracking and paging procedures including, for example, retransmissions, tracking area list management, idle mode UE tracking, etc. For example, the MME can maintain tracking information for UE regarding previous and current information for UE transitions between or within Radio Access Networks (RANs). The MME further provides for UE bearer procedures including activation, deactivation and modification; SGW and PGW selection for UE and authentication services. The SGW is a data plane element that can manage user mobility and interfaces with RANs. The SGW also maintains data paths between eNodeBs and the PGW. The PGW provides connectivity for UEs to external packet data networks, such as, for example an IP connectivity access network (IP-CAN). The S4-SGSN may provide access for legacy universal mobile telecommunications systems (UMTS) network devices. For example, UE on the GERAN can communicate through the S4-SGSN 41 to the SGW 28 or the PGW 14, which can include a gateway GPRS support node (GGSN) to support communication with legacy systems that may include GnGp-SGSNs.

Radio Access Networks (RANs) in an EPS architecture consist of eNodeBs (also known as eNBs). An eNodeB is generally connected directly to an EPC, as well as to adjacent eNodeBs. Connections with adjacent eNodeBs may allow calls to be routed more directly. An eNodeB is also responsible for selecting an MME for UE, managing radio resources, and making handover decisions for UE.

PCRF 36 may decide policy control and/or charging activities to apply to UE based on various Policy Charging and Control (PCC) rules. PCRF 36 can be configured to use user subscription information as a basis for the policy and charging control decisions. The subscription information may apply for both session-based and non-session based services. Additionally, PCRF 36 may determine PCC rules based on an application or service described to the PCRF from AF 16. PCRF 36 may be referred to generally as a policy server. AF 16 may describe applications/services to PCRF 36 that may require dynamic policy and/or charging control for one or more UE. The dynamic policy and/or charging controls may include, but not be limited to, controlling the detection for service data flows, setting charging instructions for service data flows, setting QoS levels for service data flows and/or gating. PCRF 36 may communicate PCC rules to PCEF 15 in PGW 14. PGW/PCEF 14/15 may serve as the policy enforcement point to manage QoS, online/offline flow-based charging, data generation, deep packet inspection and lawful intercept.

As shown in FIG. 1, a Diameter-based interface, Rx, may be maintained between AF 16 and PCRF 36 for communicating information between the AF 16 and PCRF 36. The PCRF 36 may provision PCC rules for the PCEF 15 (within PGW 14) using a Diameter-based Gx interface. Communication system 10 may be configured with additional Diameter interfaces to manage policy and control between various elements of the system 10. For example, Diameter interfaces, Gxa, Gxb and Gxc, may be maintained between the PCRF 36 and the trusted/non-trusted IP access points, the ePDG 20, and the SGW 28, respectively. Further Diameter interfaces, SWx, STa, SWa, and SWm may be maintained between the AAA element 24 and the HSS 18, the trusted non-3GPP IP access point, the untrusted non-3GPP access point, and the ePDG 20, respectively. Various additional Diameter interfaces may include S6a between the HSS 18 and the MME 40, S6b between the AAA element 24 and the PGW 14, and SWn between the ePDG 20 and the untrusted non-3GPP access point.

In operation, for example, UE 12a can attach to the network for purposes of establishing a communication session. UE 12a can communicate with eNodeB 34, which can further interact with MME 40 to complete some form of authentication for a particular user. MME 40 can interact with SGW 28, which interacts with PGW 14 such that a session can be setup between these components. The eNodeB 34 can interact with SGW 28 to provide data plane interactions for UE 12a. Tunnels can be established at this juncture, and a suitable IP address can also be issued for this particular user. This process generally involves a default EPS bearer session being created for UE 12a. Dedicated bearer sessions can also be created for various services. Exemplary tunnel protocols such as GPRS tunneling protocol (GTP), which can be separated into control (GTP-C) signaling protocols and user data plane (GTP-U) protocols, are shown in FIG. 1 between various elements of communication system 10. As the session is established, PGW 14 can interact with PCRF 36 to identify policies associated with this particular user, such as a certain QoS setting, bandwidth parameter, latency setting, priority, billing, etc. As the AF 16 updates services/applications described to the PCRF 36 during the session, dynamic policies may be applied to UE to effect various control and policy changes for UE.

Before detailing further operations and infrastructure of various elements of FIG. 1, certain contextual information is provided to offer an overview of some problems that may be encountered while applying dynamic policies for a group of subscribers (UE) in a network environment. Such information is offered earnestly and for teaching purposes only and, therefore, should not be construed in a way to limit the broad applications for the present disclosure.

UE 12a-12c can be associated with clients or customers wishing to initiate a flow in communication system 10 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, smartphone, tablet computer, an IP phone, or any other device, component, element, or object capable of initiating voice, audio, video, media, or data exchanges within communication system 10. UE 12a-c may also be inclusive of a suitable interface to the human user such as a microphone, a display, a keyboard, or other terminal equipment. UE 12a-c may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-c have a bundled subscription for network access and application services (e.g., voice), etc. Once the access session is established, the user can register for application services as well, without additional authentication requirements. There can be two different user data repositories (AAA databases): one for the access user profile and one for the application user profile. IP addresses can be assigned using dynamic host configuration protocol (DHCP), Stateless Address Auto-configuration, default bearer activation, etc., or any suitable variation thereof.

HSS 18 offers a subscriber database in 3GPP (e.g., GSM, LTE, etc.) environments. In one sense, HSS 18 can provide functions similar to those offered by an AAA element in a CDMA environment. When a user moves to 3GPP access, HSS 18 can be aware of this location and this anchor point (i.e., PGW 14). Additionally, HSS 18 can communicate with AAA element 24 such that when a UE moves to a CDMA environment, it still has an effective anchor for communications (i.e., PGW 14). HSS 18 and AAA element 24 can coordinate this state information for the UE (and synchronize this information) to achieve mobility. No matter how a UE moves, the access network element can be interacting with either HSS 18 or AAA element 24 in order to identify which PGW should receive the appropriate signaling. The route to a UE can be consistently maintained, where routing topology ensures that data is sent to the correct IP address. Thus, synchronization activity on the backend of the architecture allows mobility to be achieved for the user when operating in different environments. Additionally, in certain examples, PGW 14 performs home agent functions, and the trusted non-3GPP IP access network can provide packet data serving node (PDSN) functions in order to achieve these objectives.

In an embodiment, the operational functionality and services provided by SGW 28 and PGW 14 can be combined into a system architecture evolution gateway (SAE GW) (not shown), which can support combined SGW and PGW interfaces, signaling operations, functionality, services, etc. It is understood that the embodiments, process flows and use cases discussed in the present disclosure may be equally applied to communication networks that include an SAE GW.

Figure 2A:
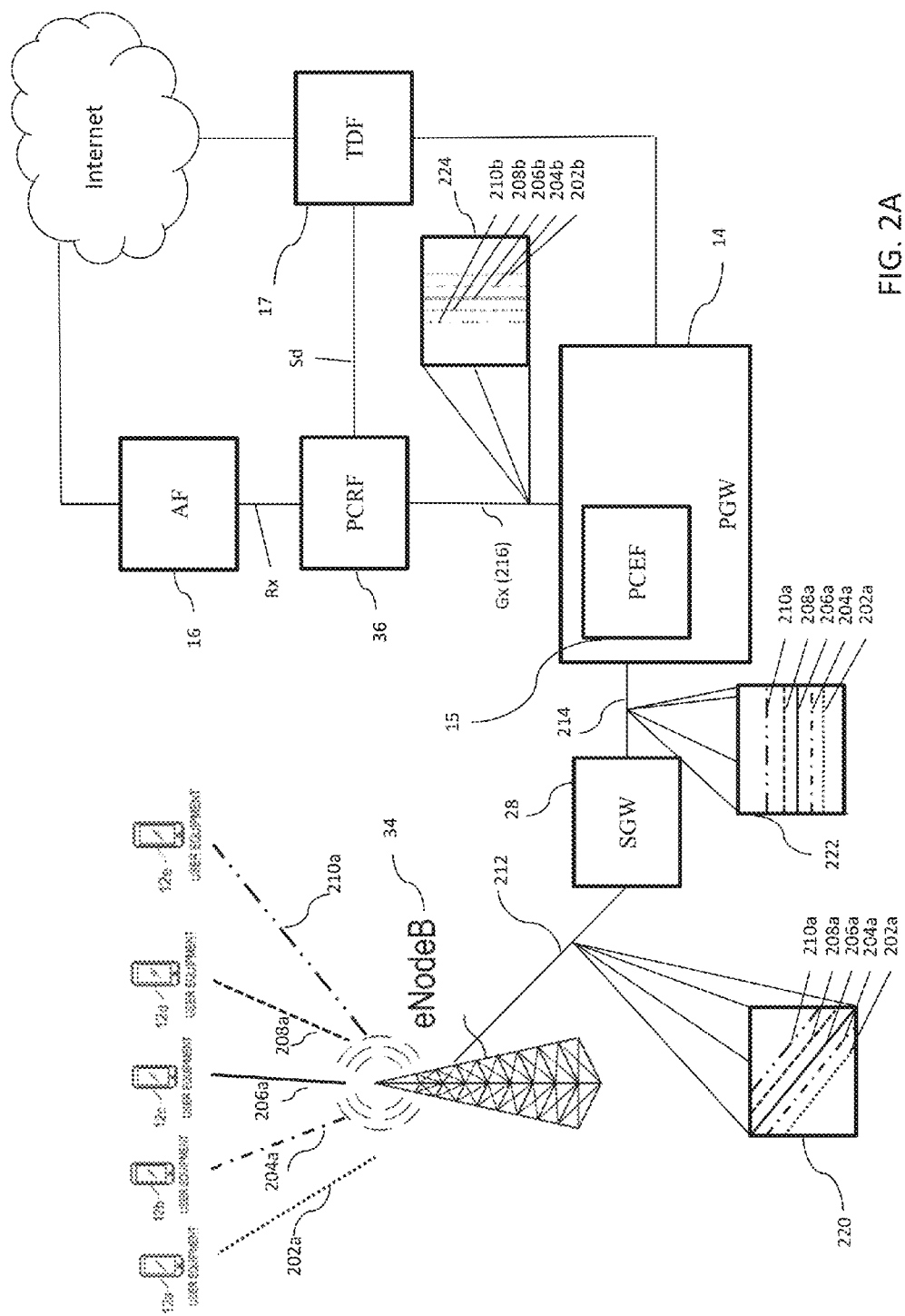
FIGS. 2A and 2B are exemplary schematic diagrams showing reporting of Radio Access Network (RAN) congestion information according to some embodiments.
Figure 2B:
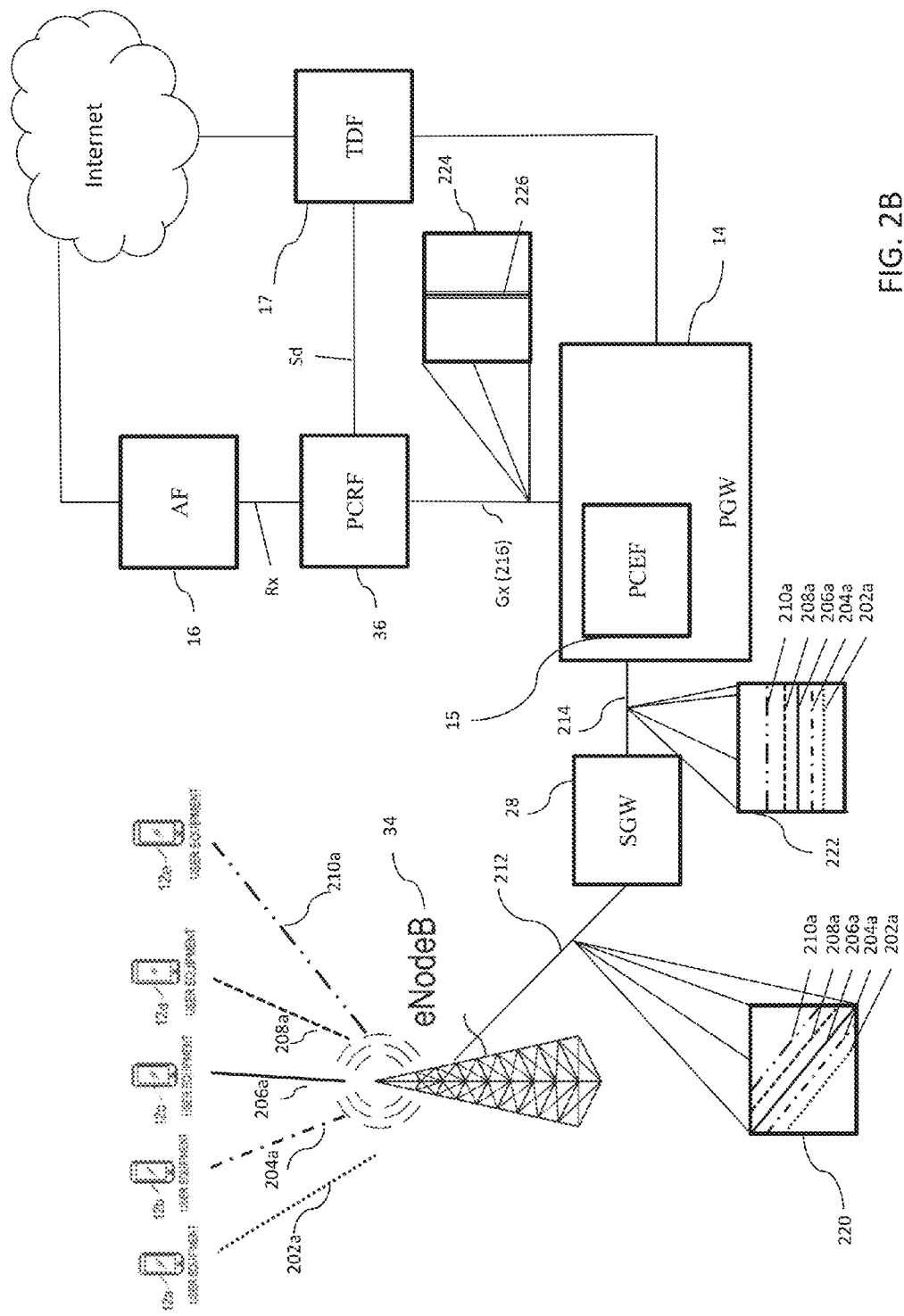

FIGS. 2A and 2B are exemplary simplified block diagrams illustrating reporting of RAN congestion information according to one embodiment of the present disclosure. FIGS. 2A and 2B contains a plurality of UEs 12*a-e*, an eNodeB base station 34, an SGW 28, a PGW 14, a PCRF 36, an AF 16, a TDF 17, and an exit node connection to the Internet 50. PGW 14 may include PCEF 15. UEs 12*a-e* may connect to eNodeB 34 transmit data signals 202*a*, 204*a*, 206*a*, 208*a*, and 210*a*. eNodeB 34 may connect to SGW 28 via connection 212. SGW 28 may connect to PGW 14 via connection 214. PGW 14 may connect to PCRF 36 via connection 216. Elements 220, 222, and 224 may be expanded views of a representation of information passed along respective connections 212, 214, and 216. Connection 216 transmits signals 202*b*, 204*b*, 206*b*, 208*b*, and 210*b*.

UEs 12*a*, 12*b*, 12*c*, 12*d*, and 12*e* are each connected to eNodeB base station 34. As described in FIG. 1, these UEs may couple to eNodeB 34 via simple interfaces using wired or wireless connections. Although five UEs 12*a*-12*e* are illustratively shown in FIGS. 2A and 2B for simplicity, it should be appreciate that eNodeB base station 34 may generally be connected to many more UEs at a time.

UEs 12*a*-12*e* respectively transmit data streams 202*a*, 204*a*, 206*a*, 208*a*, and 210*a* to eNodeB 34. Data streams 202*a*, 204*a*, 206*a*, 208*a*, and 210*a* are representations of inbound and outbound traffic from UEs 12*a*-12*e* through the EPS. Although data streams 202*a*, 204*a*, 206*a*, 208*a*, and 210*a* are represented in FIG. 2 as straight lines of different styles for clarity, it should be appreciated that they are representations of the abstract concept of communications passing to and from each individual UE 12*a*-12*e*.

As described more fully in FIG. 1, eNodeB 34 can interact with SGW 28 to provide data plane interactions for UEs 12*a-e*. eNodeB base station 34 may connect to SGW 28 via connection 212. Connection 212 may be a wired or wireless connection that provides a coupling between eNodeB 34 and SGW 28. Connection 212 may carry the data streams 202*a*-210*a* received at the eNodeB 34 and communicate them to SGW 28.

Element 220 provides an abstract representation of data streams that may be carried over connection 212 in accordance with an embodiment of the disclosure. Element 220 is an expanded view of the signals the may be carried from eNodeB 34 to SGW 28 for processing in the EPS network. Element 220 demonstrates that eNodeB 34 passes the complete data streams received from UEs 12*a*-12*e* through to SGW 28 for further processing. It should be appreciated that element 220 shows signals 202*a*-210*a* travelling in parallel for demonstrative purposes only. In practice, signals 202*a*-210*a* may not be carried along connection 212 using parallel connections, but rather may be combined and multiplexed to ensure efficient communication between eNodeB 34 and SGW 28.

As also described more fully in FIG. 1, SGW 28 can interact with PGW 14 to provide connectivity to UEs 12*a*-12*e*. SGW 28 may connect to PGW 14 via connection 214. Connection 214 may be a wired or wireless connection that provides a coupling between SGW 28 and PGW 14. Connection 214 may carry the data streams 202*a*-210*a* received passed along connection 212 from the eNodeB 34.

As with element 220 above, element 222 provides an abstract representation of data streams that may be carried over connection 212 in accordance with an embodiment of the disclosure. Element 222 is an expanded view of the signals the may be carried from SGW 28 to PGW 14 for processing in the EPS network. Element 222 demonstrates that SGW 28 passes the complete data streams received from eNodeB 34 through to PGW 14 for further processing. It should be appreciated that element 222 further shows signals 202*a*-210*a* in travelling in parallel for demonstrative purposes only. In practice, signals 202*a*-210*a* may not be carried along connection 212 using parallel connections, but rather may be combined and multiplexed to ensure efficient communication between SGW 28 and PGW 14.

PGW 14 can interact with PCRF 36 to provide policy rules enforcement for traffic over the data network. PGW 14 may connect to PCRF 36 via connection 216. Connection 216 provides a coupling between PGW 14 and PCRF 36. Connection 216 carries control information about UEs 12*a*-12*e*. This information contains control plane messages for processing at the PCRF, including RAN congestion information (RCI). Control plane messages passed along connection 216 and associated with the UEs 12*a*-12*e* (and hence with the data streams 202*a*-210*a*) is depicted as signals 202*b*, 204*b*, 206*b*, 208*b*, and 210*b*.

As with elements 220 and 222 above, element 224 provides an abstract representation of control plane signaling that may be carried over connection 216 in accordance with an embodiment of the disclosure. In FIG. 2A, element 224 is an expanded view of the signals the may be carried from PGW 14 to PCRF 36 for processing in the EPS network. Element 224 demonstrates that PGW 14 passes information on a session level for each of data streams 202*b*-210*b* to PCRF 36 for policy decisions processing. It should be appreciated that element 224 further shows signals 202*b*-210*b* in travelling in parallel for demonstrative purposes only. In practice, signals 202*b*-210*b* may not be carried along connection 212 using parallel connections, but rather may be combined and multiplexed to ensure efficient communication between PGW 14 and PCRF 36.

Connection 216 between PGW 14 and PCRF 36 can be referred to as the Gx interface, as indicated in FIG. 1. The Gx interface can be an interface that provisions rules from the PCRF 36 to the Policy and Charging Enforcement Function (PCEF) 15 located within PGW 14, in accordance with the subscriber's state information (e.g. RAT type, location, RAN congestion info etc.) provided by the PCEF to the PCRF. The PCEF may directly request rule information over the Gx interface from the PCRF, or the PCRF may directly send rule information at regular time intervals.

In FIG. 2A, PGW 14 reports RAN congestion information to PCRF 36 at a session level, requiring that RAN congestion information be reported separately for each UE connected to eNodeB 34. For example, element 224 of FIG. 2A illustrates that information related to the subscribers 12*a*-12*e* (i.e., related to streams 202*b*, 204*b*, 206*b*, 208*b*, and 210*b*) is directly reported over connection 216 to PCRF 36. Upon receiving this information, PCRF 36 may take action based on an associated set of rules. In one example, PCRF 36 may throttle the connection speeds of all UEs connected to eNodeB 34. In another example, PCRF 36 may throttle traffic of certain types, e.g., streaming video or streaming audio. In yet another example, PCRF 36 may not choose to throttle connections, but rather may increase latency in servicing connections, causing delays at the UE before traffic is processed. In FIG. 2A, the policy decisions regarding relief of RAN congestion are made on a per UE basis, and the RAN congestion information is reported and responded to separately for each UE over the Gx interface.

In FIG. 2A, connection 216 is shown between PGW 14 and PCRF 36 to indicate communication of information, including RAN congestion information, between PGW 14 and PCRF 36. Although not shown, other nodes in the network may receive reports of RAN congestion information from the PCRF 36. For example, PCRF 36 may connect directly to AF 16 to report RAN congestion information. As shown in FIG. 1, this connection can be the Rx interface. In addition, PCRF 36 may connect to TDF 17 to report RAN congestion information. This connection can be the Sd interface.

FIG. 2B illustrates a different method of communication of RAN congestion information between PGW 14 and PCRF 36 than shown in FIG. 2A. Unlike the design in FIG. 2A, in FIG. 2B RAN congestion information may not be communicated from the PGW 14 to PCRF 36 on a per session basis. Rather, in FIG. 2B, PGW 14 may aggregate RAN congestion information for UEs attached to an eNodeB (e.g., UEs 12a-12e attached to eNodeB 34) by inspecting the traffic for each session contained within data streams 202a-210a over a time interval. The aggregated RAN congestion information for all of the attached UEs may then be reported to PCRF 36 in a single, new or existing message, as described more fully below. The PGW 14 may establish any time interval for use in the aggregation stage; in one exemplary implementation, the RAN congestion time interval for collection of RAN congestion information is between 10 and 60 seconds.

After aggregating RAN congestion information for UEs connected to an eNodeB, PGW 14 may communicate the aggregated RAN congestion information to PCRF 36 over communication link 216. As shown in FIG. 2B, the message communicating RAN congestion information is aggregated into a single signal 226. The message containing the aggregated RAN congestion information (corresponding to information contained within signal 226) may comprise a new message type, called Node-Info-Push. In this embodiment, elements of the network, e.g., PCRF 36, AF 16 (through PCRF 36), and TDF 17 may subscribe to PGW 14's aggregated RAN congestion reports. The Node-Info-Push message may be communicated over various existing communications links in the network system; for example, the Node-Info-Push message may be communicated over the Gx interface between PGW 14 and PCRF 36 (connection 216), the Rx interface between PCRF 36 and AF 16, and the Sd interface between TDF 17 and PCRF 36.

In an example, the Node-Info-Push message may contain a particular list of information sent to each network element requesting RAN congestion information. In this example, the Node-Info-Push message may contain lists of International Mobile Subscriber Identity numbers (IMSIs), Gx session ID numbers, RAN Congestion Information (RCI), and EUTRAN Cell Global Identifiers (ECGIs) for each UE connected to a node (e.g., for each of UEs 12a-e in FIG. 2). The Node-Info-Push message may contain an RCI value received by the PGW for each specific UE and PDN connection for a specified IMSI.

The Node-Info-Push message may be generated by the PGW 14 as follows. During a configurable time duration t, the PGW 14 may collect the RCI information received for the different UEs, e.g., UEs 12a-e. The PGW 14 may be aware of a UE's IMSI and the Gx session associated with a given network connection, and thus has sufficient information to build the list of information to populate the Node-Info-Push message (e.g., lists of IMSIs, Gx session IDs, RCI, and ECGIs) for the RCI values received for each UE during time duration t. In an embodiment, multiple RCI values may be received for the same UE and Gx session ID. In this embodiment, the most recent RCI value may be used in the Node-Info-Push message. Once the time duration t has elapsed, the PGW 14 may build the list of information to populate the Node-Info-Push message for all sessions for which the PCRF requested RCI reporting. Thus, the Node-Info-Push message will contain the RCI for all desired sessions, rather than a single session. The PGW may then send the Node-Info-Push message containing this list to PCRF 36. In this way, Node-Info-Push provides a single message containing RAN congestion information for desired sessions, substantially reducing signaling required to report RAN congestion data. In another embodiment, the PGW 14 can be configured to report RCI for all active sessions for each UE on a node, e.g., eNodeB 34, to PCRF 36. The value oft can be fixed as one value all the time, or it can be varied over a short term or over a longer term depending on circumstances and parameters. The value can be determined within PGW 14 or signaled to PGW 14, e.g., from the PCRF 36.

When receiving the Node-Info-Push message, the PCRF 36 may acknowledge receipt of this information, and may decide to update, on a per session basis, PCC and/or ADC rules based on the RAN congestion information received. The PCRF 36 may also forward the received RCI information to AF 16 and/or TDF 17 over the Rx and Sd interfaces connecting PCRF 36 to AF 16 and TDF 17, respectively. In these cases, the PCRF may reconstruct the Node-Info-Push message using Rx and Sd information (e.g., lists of IMSIs, Rx session IDs or Sd session IDs, RCI, and ECGIs) based on the subscribed network element (e.g., the AF 16 or the TDF 17).

In one embodiment, subscription to the Node-Info-Push message type may be agreed upon by network node pairs (e.g., PGW 14 and PCRF 36, PCRF 36 and AF 16, or PCRF 36 and TDF 17) at the start of a network session. In this embodiment, the network nodes may negotiate subscription to the Node-Info-Push message reporting based on administrator preferences. In another embodiment, network nodes may choose to subscribe to RCI reporting for an existing network connection.

In yet another embodiment, the Node-Info-Push message construct may not comprise an independent message, but rather a new grouped information element which may be communicated over existing message protocols. In this embodiment, the aggregated congestion information may be "piggybacked" on top of existing message types without introduction of a new message or application.

It should be appreciated that, while FIGS. 2A and 2B illustrate reporting of RAN congestion information that has been collected from data streams 202a-212a, RAN congestion information may be obtained by other means not shown. For example, eNodeB 34 may indirectly communicate with SGW 28 through an intermediate node such as a Mobility Management Entity (MME) (not shown). In this example, may provide RAN congestion information to the SGW 28 over a control plane interface. The SGW 28 may then forward this information to the PGW 14 via control plane or data plane interface, which may then use the received RAN congestion information to generate the new message. Other means may also be used to forward RAN congestion information to the PGW 14.

Figure 3A:
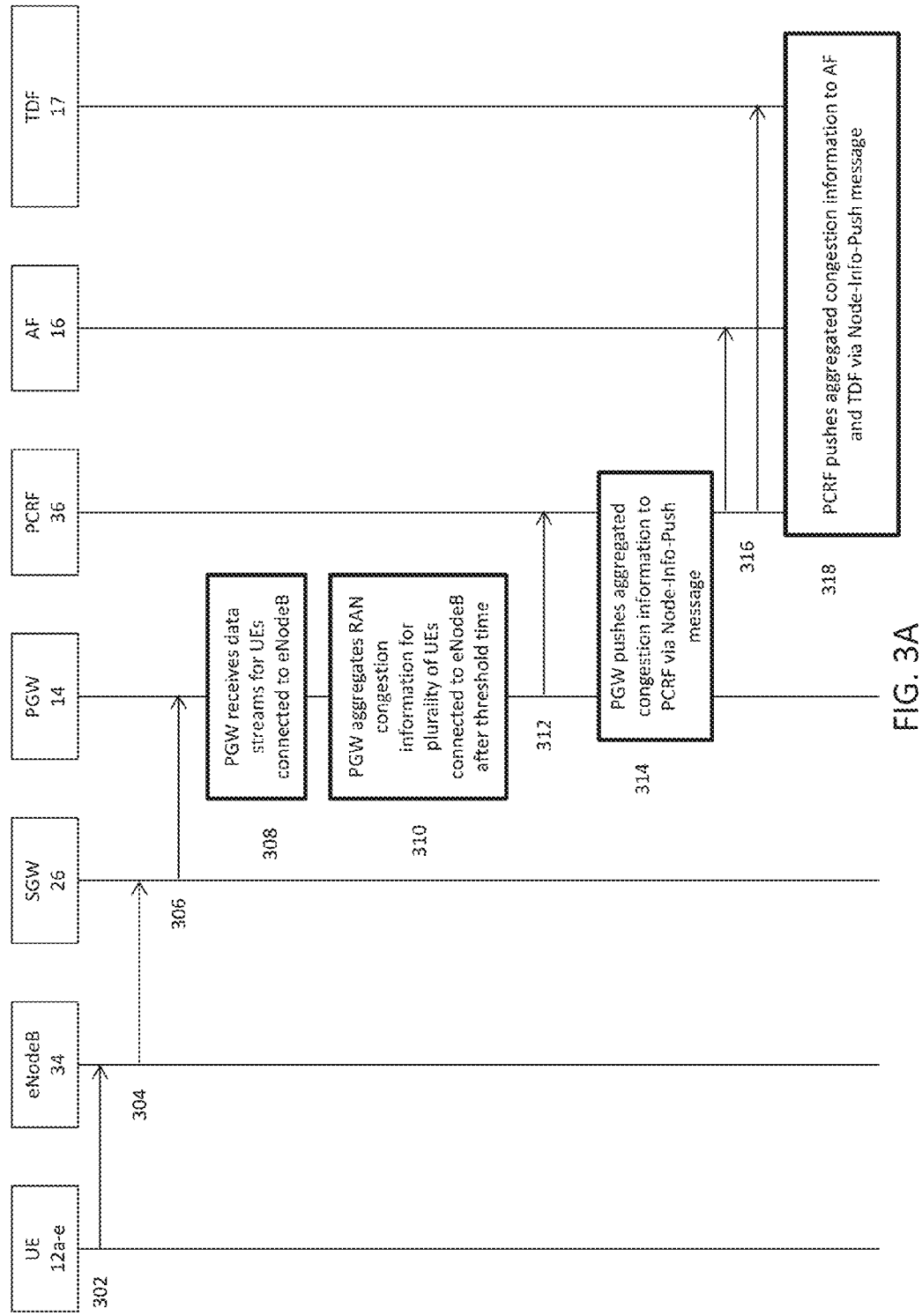
FIGS. 3A and 3B are exemplary call flow diagrams illustrating a method for reporting of RAN congestion information according to some embodiments.
Figure 3B:
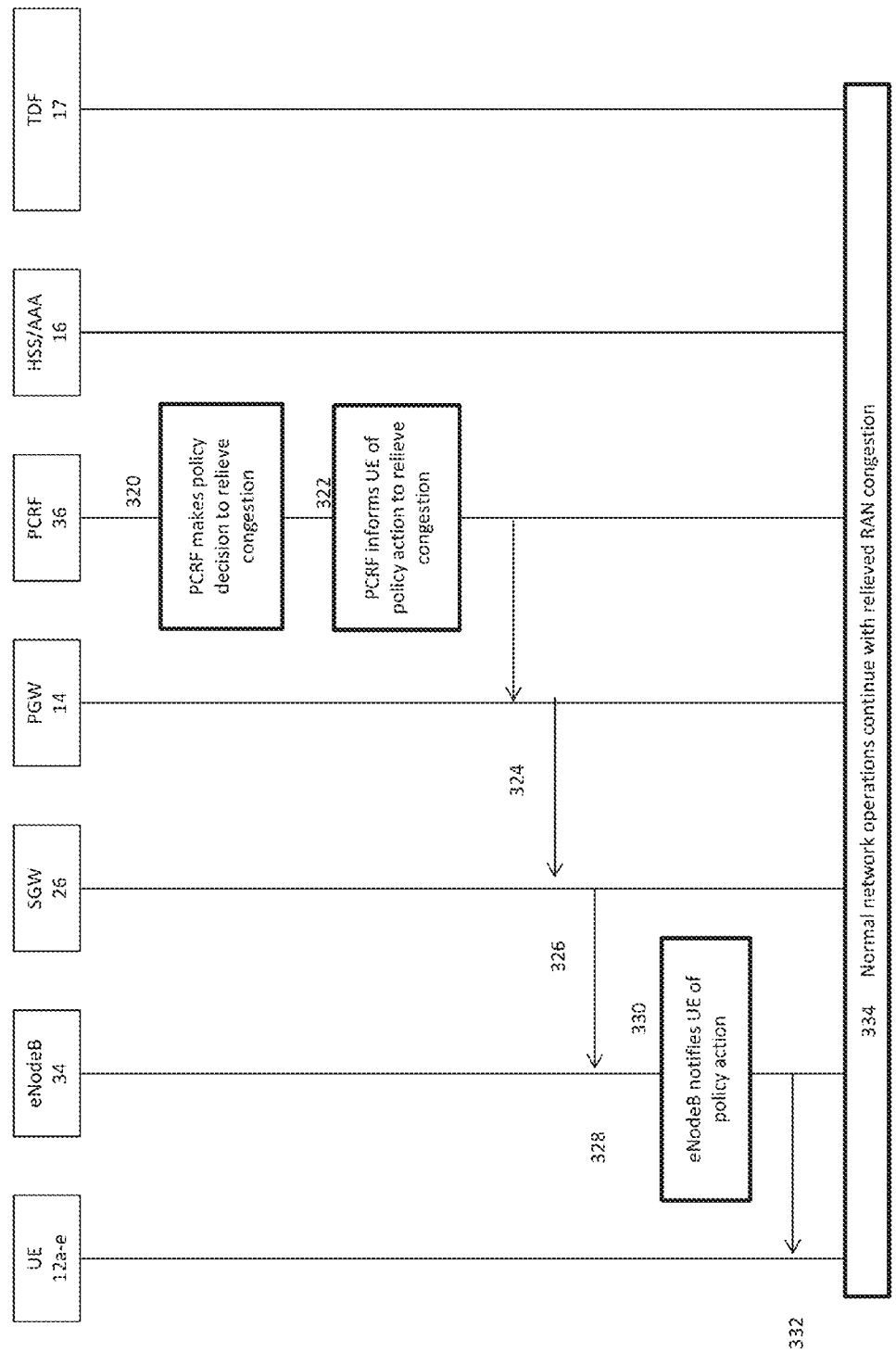

FIGS. 3A and 3B depict an exemplary packet flow for reporting RAN congestion information according to some embodiments of the disclosure. The packet flow described in FIGS. 3A and 3B correspond to the flow through the structural elements provided in FIGS. 2A and 2B, and in particular illustrates the process shown in FIG. 2B.

In FIG. 3A, UEs 12a-e may send data packets to eNodeB 34 (flow 302). eNodeB 34 then forwards the packet to SGW 34 (flow 304), which then forwards the message to PGW 14 (flow 306). PGW 14 thus receives packets corresponding to data streams 202a-210a (step 308). PGW 14 then continues to collect RAN congestion information from incoming data packets or any other means. After a predetermined time interval, PGW 14 processes the previously acquired data comprising RCI for each session into a single message comprising aggregated RCI for the node (step 310). After generating this message, PGW 14 may push the message to other nodes within the network that may subscribe to the RCI, such as PCRF 36. In FIG. 3A, the aggregated RAN congestion information is passed via a Node-Info-Push message to PCRF 36 (flow 312 and step 314). The aggregated RCI can further be passed via the Node-Info-Push message from PGW 14 to AF 16 or TDF 17 (flow 316 and step 318).

In FIG. 3B, PCRF 16 may make a policy decision to relieve congestion in the network (step 320). Although FIG. 3B demonstrates RAN congestion relief via a policy decision at the PCRF 36, it is appreciated that the AF 16 and the TDF 17 may also use the aggregated RAN congestion information to make a policy decision regarding relief of RAN congestion. In one embodiment, relief of RAN congestion may comprise throttling data connection speeds for all UEs connected to an eNodeB. In another embodiment, the PCRF 36 may increase latency of connections on the network. In yet another embodiment, the PCRF 36 may selectively throttle connections using high bandwidth, e.g., video and audio data streams. PCRF 36 may then communicate the policy decision to the UEs, causing them to exhibit the desired behavior (step 322). To accomplish this function, PCRF 36 may communicate a control packet to PGW 14 (flow 324). PGW 14 may then forward the control packet to SGW 26 (flow 326). The SGW 26 may then forward the control packet to eNodeB 34 (flow 328). eNodeB 34 may then communicate the control packet to UEs 12a-e (step 330 and flow 332). At stage 334, normal network operations continue with reduced RAN congestion.

Figure 4:
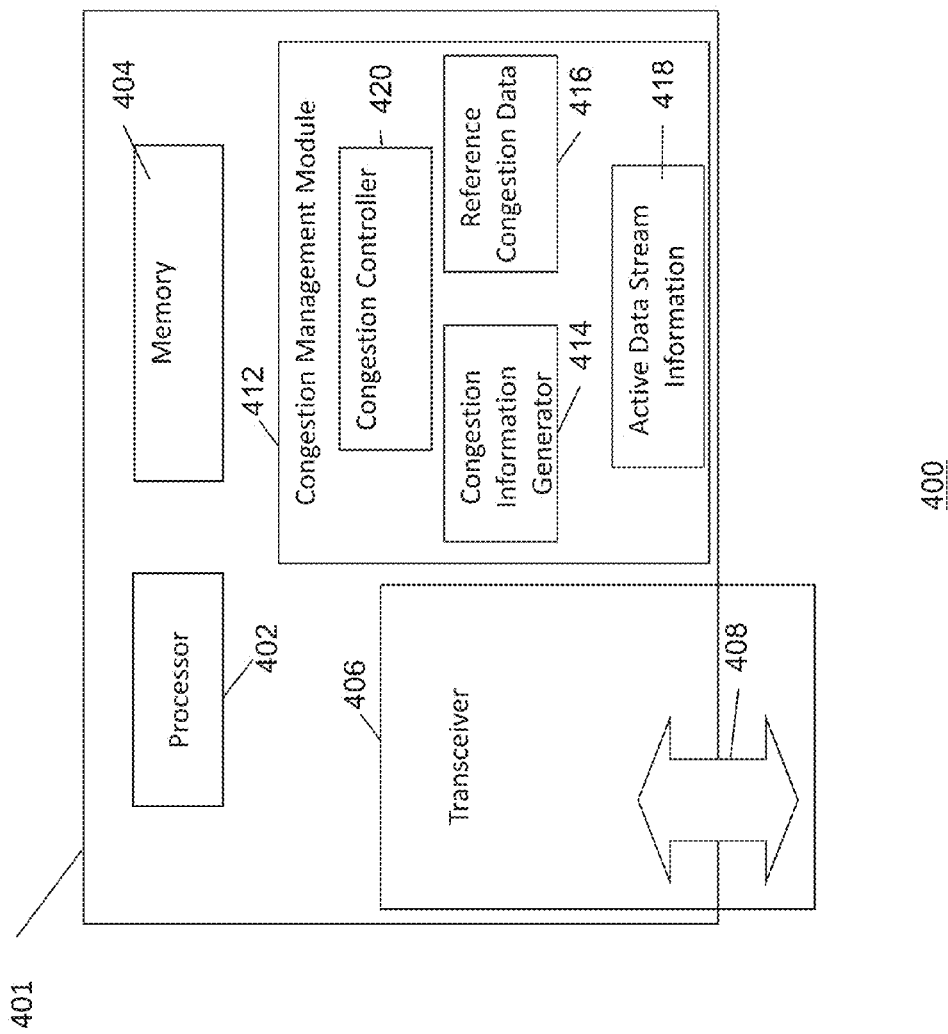
FIG. 4 is a logical diagram illustrating one implementation of an intermediary network node for implementing aggregated RAN congestion relief services, according to some embodiments.

FIG. 4 illustrates a logical view 400 of an intermediate network node 401 (such as PGW 134 or PCRF 128) that implements congestion control services in accordance with certain embodiments. The intermediary node includes a transceiver 406 that implements an interface 408, a processor 402, a memory 404, and a congestion management module 412 that is provided using processor 402 and memory 404, wherein the congestion management module includes a congestion information generator 414, reference congestion data 416, active data stream information 418, and a congestion controller 420.

Interface 408 includes one or more physical connections that can be either wired or wireless to communicate information to and from intermediary network node 401. Intermediate network node 401 transmits and receives radio, electrical, optical or other data signals on interface 408 to and from access networks (such as AS 140), to and from other network nodes (such as MME 122, or HSS/AAA 126), and, in certain embodiments, to and from user equipment (such as UE 110). Processor 402 can be one or more integrated circuits that are multipurpose, programmable, clock-driven, register-based electronic devices that accept binary data as input, processes it according to instructions stored in its memory, and provides results as output. In some embodiments, processor 402 can be constructed for a specific purpose such as to provide callback services.

Memory 404 can be any type of computer readable medium such as random access memory (RAM), programmable read-only memory (PROM), a field programmable gate array (FPGA), flash memory, optical disk drive, or magnetic storage medium. Memory 404 can be used to store computer programs or logic that can be run on processor 402.

Processor 402 and memory 404 can be used to provide congestion management module 412, which includes congestion information generator 414, reference congestion data 416, active data stream information 418, and congestion controller 420. In some embodiments, active data stream information 418 can comprise data usage information relating to data streams 202-210 in FIG. 2. Congestion management module 412 can include information stored in memory 404 (such as active data stream information 418) upon which action is taken by processor 402. In some embodiments, congestion management module 412 and its sub-components can be implemented as a module that is a combination of hardware and software—in these embodiments, congestion management module 412 may utilize its own dedicated processor and memory, or module 412 may utilize processor 402 and memory 404. In other embodiments, congestion management module 412 can be implemented only as software which is stored in memory 404 and run on processor 402.

Congestion management module 412 can include congestion controller 420, which can be responsible for aggregating congestion information, generating a new aggregated congestion message, and enforcing corrective actions as described in FIGS. 2A-2B and FIGS. 3A-3B above. In some embodiments, congestion controller 420 can base its determination on information received from other network nodes (e.g., eNodeB 34 or SGW 26). Congestion controller 420 can also be responsible for determining when network node 401 should send a congestion control message to UEs 12a-e. Once congestion controller 420 determines that a congestion control message should be sent, it can use congestion information generator 414 to generate a congestion control message. Congestion information generator 414 can use active data stream information 418 to determine whether a to implement congestion control, and if so, what corrective action should be taken at each UE.

Figure 5:
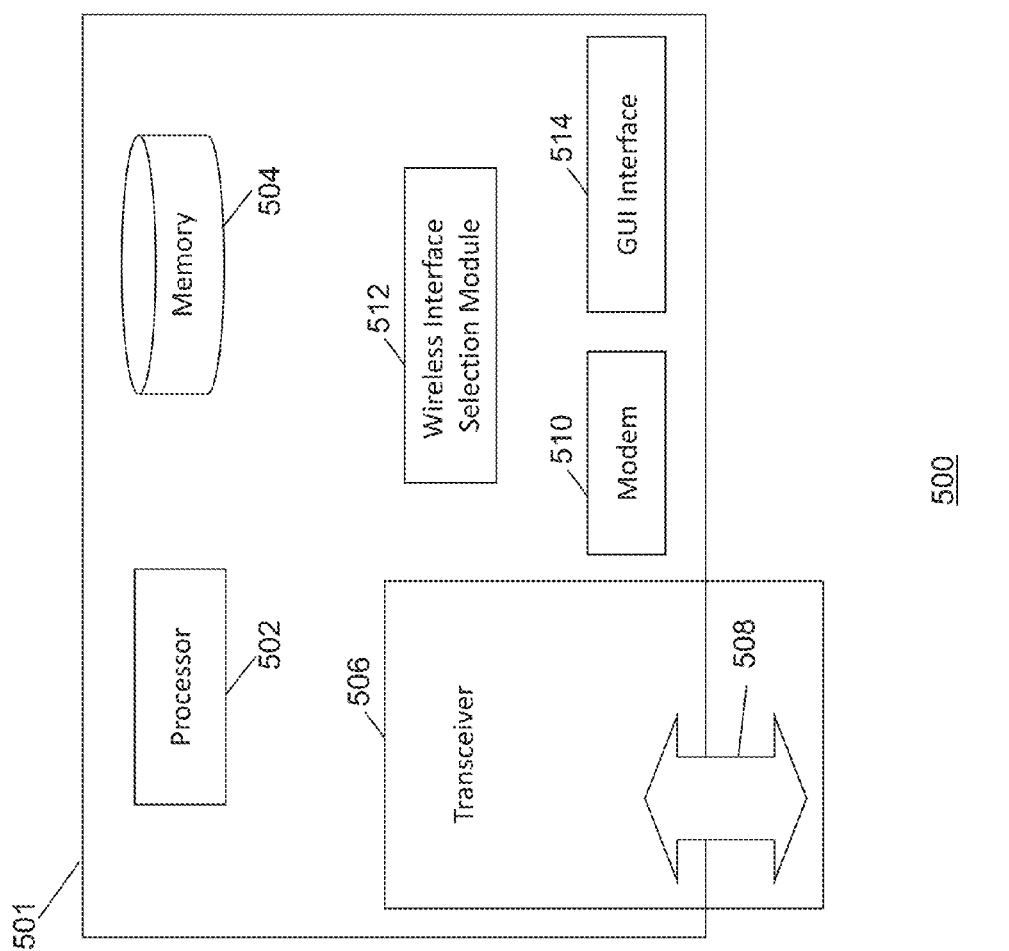
FIG. 5 is a logical diagram illustrating one implementation of a UE, according to some embodiments.

FIG. 5 illustrates a logical view 500 of user equipment (UE) 110 in accordance with certain embodiments. The UE 110 can include a processor 502, a memory 504, a transceiver 506 including an interface 508, a modem 510, a wireless interface selection module 512, and a GUI interface 514.

The transceiver 506 includes a transmitter and a receiver. The transmitter and the receiver can be integrated into a single chip or can be embodied in separate chips. The transceiver 506 can also include an interface 508 that provides an input and/or output mechanism to communicate with other network devices. The interface 508 can measure the wireless signal strengths of wireless interfaces such as base stations and access points. The interface 508 can be implemented in hardware to send and receive signals in a variety of mediums, such as optical, copper, and wireless, and in a number of different protocols some of which may be non-transient.

The modem 510 is configured to implement modulation and framing of signals according to one or more communication standards. The communication standards include the cellular standards defined under 3GPP.

The wireless interface selection module 512 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 512 can select the serving wireless interface by analyzing data load information associated with wireless interfaces. In certain embodiments, the wireless interface selection module 512 can be configured to attach to a wireless interface handling the least amount of data traffic and/or with more available resources. In certain embodiments, the wireless interface selection module 512 can also analyze additional information to decide to which wireless interface to connect. For example, the wireless interface selection module 512 can use one or more of the following: the load condition associated with the candidate wireless interfaces, the wireless signal strength associated with the candidate wireless interfaces, and a configuration status on the wireless interface selection module 512 indicating whether the UE 110 favors the cellular network or the WLAN.

The wireless interface selection module 512 can be implemented in software using memory 504 such as a non-transitory computer readable medium, a programmable read only memory (PROM), or flash memory. In some embodiments, the memory 504 can be used to implement the table 502 depicted in FIG. 5, which keeps track of which application or QoS corresponds to a particular reference cookie. The software can run on a processor 502 that executes instructions or computer code. The wireless interface selection module 512 may also be implemented in hardware using an application specific integrated circuit (ASIC), programmable logic array (PLA), or any other integrated circuit.

The GUI interface 514 can provide communication with an input and/or output mechanism to communicate with UE users. UE users can use input/output devices to send/receive data to/from the UE 110 over the GUI interface 110. Input/output devices can include, but are not limited to, a keyboard, a screen, a touch screen, a monitor, and a mouse. The GUI interface 514 can operate under a number of different protocols. The GUI interface 514 can be implemented in hardware to send and receive signals in a variety of mediums, such as optical, copper, and wireless.

The UE 110 described above can communicate with a plurality of radio access networks using a plurality of access technologies and with wired communication networks. The UE 110 can be a smart phone offering advanced features and capabilities, such as word processing, web browsing, gaming, e-book capabilities, an operating system, and a full keyboard. The UE 110 may run an operating system such as Symbian OS, iPhone OS, RIM's Blackberry, Windows Mobile, Linux, Palm WebOS, and Android. The screen may be a touch screen that can be used to input data to the UE 110 and the touch screen can be used instead of the full keyboard. The UE 110 may have the capability to run applications or communicate with applications that are provided by servers in the communication network. The UE 110 can receive updates and other information from these applications on the network.

The UE 110 also encompasses many other devices such as televisions (TVs), video projectors, set-top boxes or set-top units, digital video recorders (DVR), computers, netbooks, laptops, and any other audio/visual equipment that can communicate with a network. The UE 110 can also keep global positioning coordinates, profile information, or other location information in its stack or memory. The UE 110 can have a memory such as a computer readable medium, flash memory, a magnetic disk drive, an optical drive, a programmable read-only memory (PROM), and/or a read-only memory (ROM). The UE 110 can be configured with one or more processors 502 that process instructions and run software that may be stored in memory 504. The processor 502 can also communicate with the memory 504 and interfaces to communicate with other devices. The processor 502 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 110 can also provide a variety of user interfaces (e.g., GUI Interface 514) such as a keyboard, a touch screen, a trackball, a touch pad, and/or a mouse. The UE 110 may also include speakers and a display device in some embodiments.

Any of the network components specified in this disclosure, including PGW 134, PCRF 128, and AS 140 (any of which can be implemented as or in combination with intermediate network node 601 depicted in FIG. 4), can be implemented, at least in part, in a network device in some embodiments. This network device can implement multiple and different integrated functionalities. In some embodiments, one or more of the following additional functionalities can be implemented on the network device including a security gateway (SeGW), an access gateway, a Gateway General packet radio service Serving Node (GGSN), a serving GPRS support node (SGSN), a packet data interworking function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. If the network device is serving as a gateway, the gateway can be implemented as any combination of the following: an xGSN, an xGW, an xGW-SGW, and an xGW-PGW.

Figure 6:
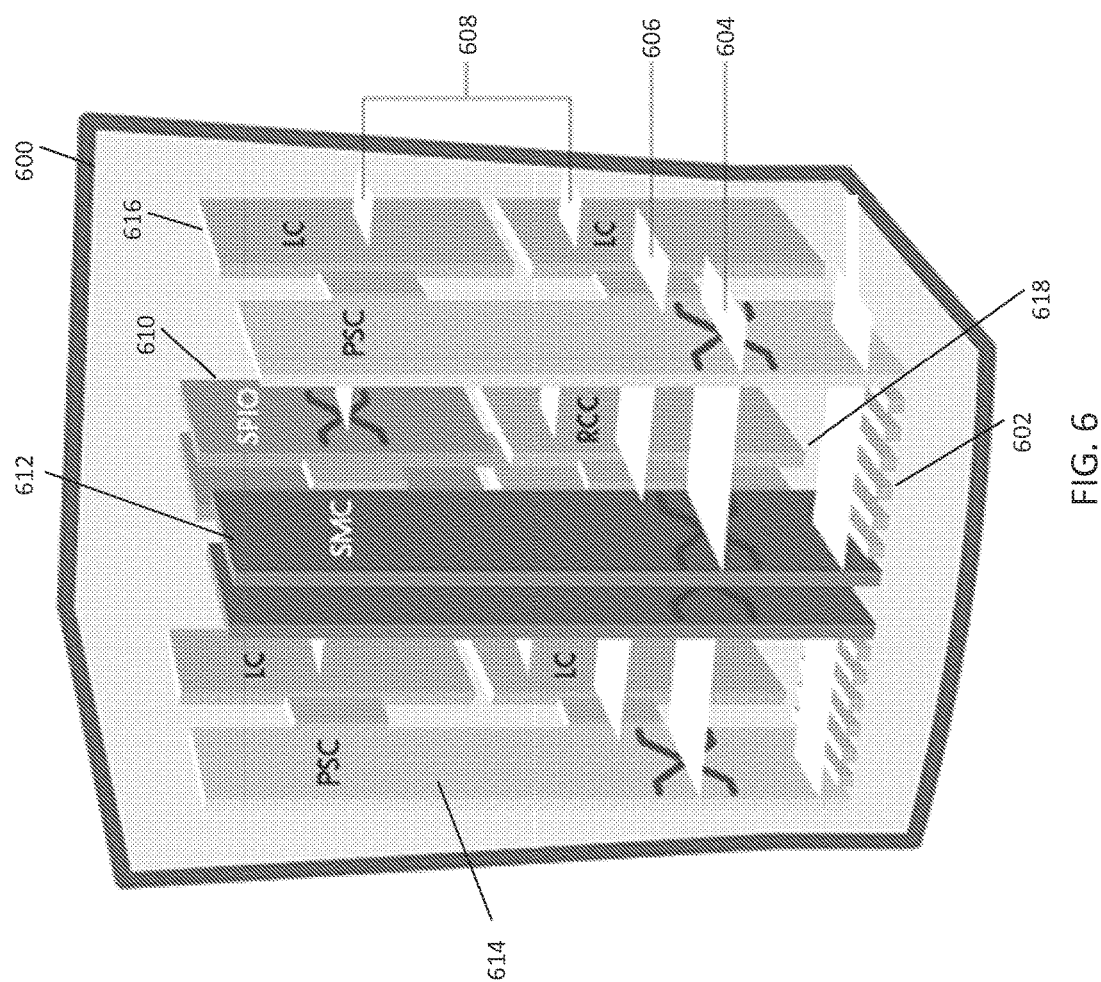
FIG. 6 illustrates the implementation of a network device, according to some embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 6 illustrates the implementation of a network device 600 in accordance with some embodiments. The network device 600 includes slots 602 for loading application cards and line cards. A midplane can be used in the network device 600 to provide intra-network device communications, power connections, and transport paths between the various installed cards. The midplane can include buses such as a switch fabric 604, a control bus 606, a system management bus, a redundancy bus 608, and a time division multiplex (TDM) bus. The switch fabric 604 is an IP-based transport path for user data throughout the network device 600 implemented by establishing inter-card communications between application cards and line cards. The control bus 606 interconnects the control and management processors within the network device 600. The network device management bus provides management of system functions such as supplying power, monitoring temperatures, board status, data path errors, card resets, and other failover features. The redundancy bus 608 provides transportation of user data and redundancy links in the event of hardware failures. The TDM bus provides support for voice services on the system.

The network device 600 supports at least four types of application cards: a switch processor I/O card (SPIO) 610, a system management card (SMC) 612, a packet service card (PSC) 614, and a packet accelerator card (not shown). Other cards used in the network device 600 include line cards 616 and redundant crossbar cards (RCC) 618. The line cards 616, when loaded in the network device 600, provide input/output connectivity to the network and other devices, as well as redundancy connections. The line cards 616 include interfaces to the network through Ethernet, Fiber Optic, and/or any other communication mediums. The redundant crossbar card (RCC) 618 includes a non-blocking crossbar and connections to each of the cards in the network device 600. This allows a redundant connection to be made through the redundant crossbar card 618 from any one card to any other card in the network device 600. The SPIO card 610 serves as a controller of the network device 600 and is responsible for such things as initializing the network device 600 and loading software configurations onto other cards in the network device 600.

The system management card (SMC) 612 and switch processor card (not shown) are system control and management cards for managing and controlling other cards in the network device 600. The packet accelerator card (PAC) and packet service card (PSC) 614 provide packet processing, context processing capabilities, and forwarding capabilities among other things. The PAC and PSC 614 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 600 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 600 can be divided into a series of tasks that perform specific functions. These tasks communicate with each other as needed to share control and data information throughout the network device 600. A task is a software process that performs a specific function related to system control or session processing. Three types of tasks operate within the network device 600 in some embodiments: critical tasks, controller tasks, and manager tasks. The critical tasks control functions that relate to the ability of the network device 600 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 600) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 110), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 7:
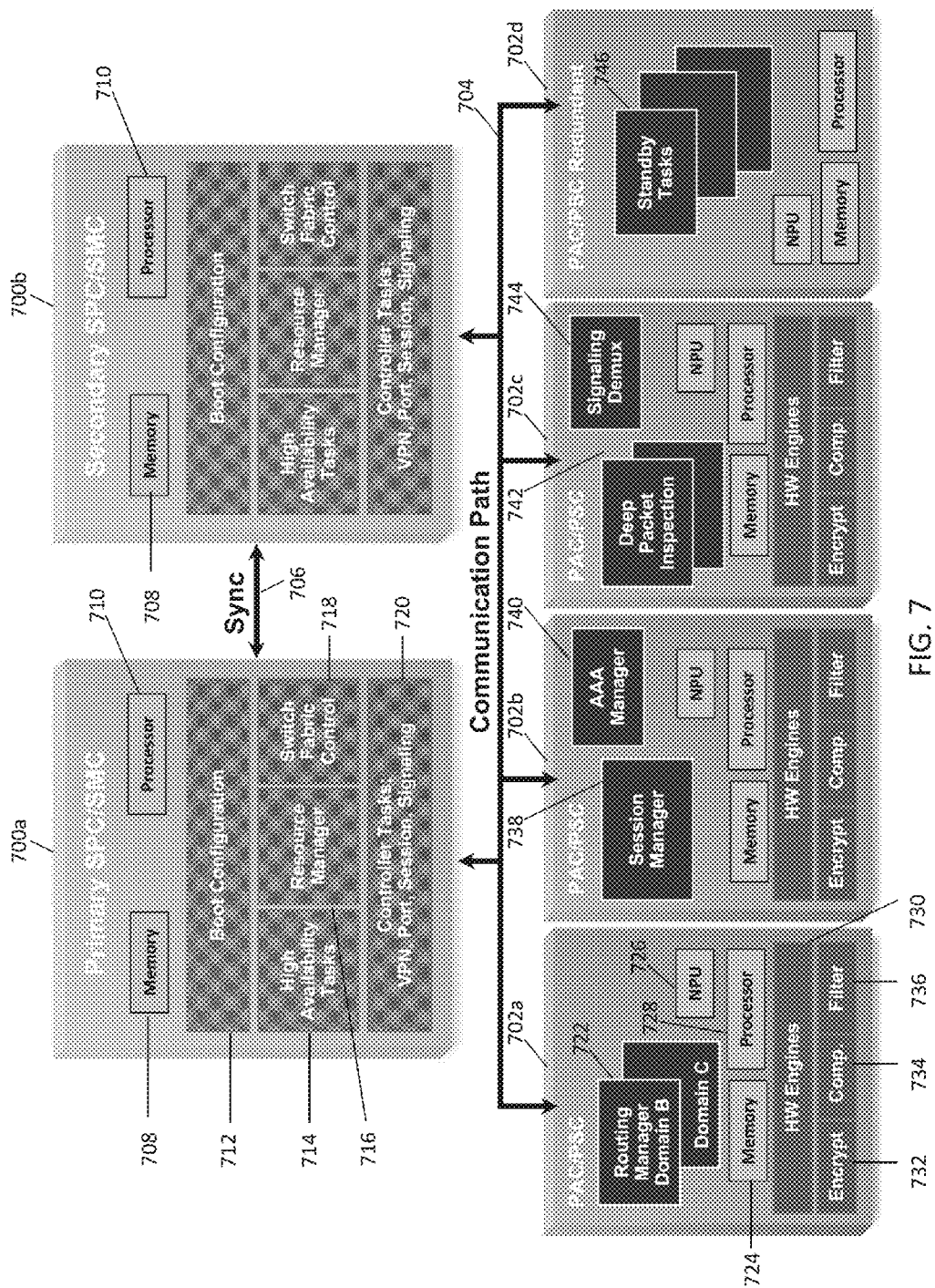
FIG. 7 is a logical view of the software architecture of a network device, according to some embodiments.

FIG. 7 illustrates a logical view 700 of the software architecture of a network device (e.g., network device 700) in accordance with certain embodiments. As shown, the software and hardware can be distributed within the network device and across different circuit boards, processors, and memory. FIG. 7 includes a primary switch processor card (SPC)/system management card (SMC) 700a, a secondary SPC/SMC 700b, PAC/PSC 702a-702d, a communication path 704, and a synchronization path 706. The primary SPC/SMC 700a and the secondary SPC/SMC 700b each includes a memory 708, a processor 710, a boot configuration 712, high availability tasks 714, resource manager 716, switch fabric control 718, and controller tasks 720.

The SPC/SMC 700 (both primary and secondary) manages and controls the network device including the other cards in the network device. The SPC/SMC 700 can be configured in a primary and secondary arrangement that provides redundancy and failsafe protection. The modules or tasks running on the SPC/SMC 700 are related to network device wide control and management. The boot configuration task 712 includes information for starting up and testing the network device. The network device can also be configured to startup in different configurations and providing different implementations. These can include which functionalities and services are capable of running on the SPC/SMC 700. The high availability task 714 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 700 or a PAC/PSC 702, while some processor intensive tasks can also be performed across multiple PACs/PSCs to utilize multiple CPU resources. Distribution of these tasks is invisible to the user. The switch fabric control 718 controls the communication paths in the network device. The controller tasks module 720 can manage the tasks among the resources of the networks to provide, for example, VPN services, assign ports, and create, delete, and modify sessions for UE 110.

The PAC/PSC 702 is a high-speed processing card that is designed for packet processing and the tasks involved with providing various network functionalities on the network device. The PAC/PSC 702 include a memory 724, a network processing unit (NPU) 726, a processor 728, a hardware engine 730, an encryption component 732, a compression component 734, and a filter component 736. Hardware engines 730 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 702 is capable of supporting multiple contexts. The PAC/PSC 702 is also capable of running a variety of tasks or modules. PAC/PSC 702a provides routing managers 722 with each covering routing of a different domain. PAC/PSC 702b provides a session manager 738 and an AAA manager 740. The session manager 737 manages one or more sessions that correspond to one or more UE 108. A session allows a UE 110 to communicate with the network for voice calls and data. The AAA manager 740 manages accounting, authentication, and authorization with an AAA server in the network. PAC/PSC 702c provides a DPI task 742 and a signaling demux 744. The DPI task 742 provides inspection of packet information beyond layer 4 for use and analysis by the network device. The signaling demux 744 can provide scalability of services in combination with other modules. PAC/PSC 702d provides redundancy through standby tasks 746. Standby tasks 746 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x76 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. A network apparatus in a core network, the network apparatus comprising a Packet Data Network (PDN) gateway (PGW), the network apparatus comprising:
   one or more interfaces; and
   a processor in communication with the one or more interfaces;
   the network apparatus to:
      receive a first indication of congestion information related to a first user equipment (UE) during a time period;
      receive a second indication of congestion information relating to a second UE during that same time period;
      generate a message aggregating the congestion information comprising at least the first and second indications of congestion information; and
      send the message comprising the aggregated congestion information to the PCRF node over one of the interfaces.

2. The network apparatus of claim 1, further comprising the PCRF node, wherein the PCRF node further sends the message to an Application Function (AF) node.

3. The network apparatus of claim 1, further comprising the PCRF node, wherein the PCRF node further sends the message to a Traffic Detection Function (TDF) node.

4. The network apparatus of claim 1, wherein the message comprises a Node-Info-Push message.

5. The network apparatus of claim 1, wherein the network apparatus is a packet data network gateway (PGW) and the first and second indications are received from one or more radio access networks.

6. The network apparatus of claim 5, wherein the network apparatus collects congestion information for multiple UEs over a time period t.

7. The network apparatus of claim 5, wherein the apparatus is configured to negotiate whether or not the network apparatus will aggregate the message prior to use.

8. The network apparatus of claim 5, wherein the aggregated congestion information is piggybacked onto an existing message.

9. A method for providing congestion information in a network system, comprising:
   receiving, at a Packet Data Network (PDN) gateway (PGW) in communication with multiple user equipments (UEs) via radio access networks (RANs), a first indication of congestion information relating to a first UE;
   receiving, at the PGW, a second indication of congestion information relating to a second UE;
   generating, by the PGW, a message indicating aggregated congestion information including at least the first and second indications of congestion information; and
   sending, by the PGW, the aggregated congestion information message to a policy charging rules function (PCRF) node.

10. The method of claim 9, further comprising sending the message from the PCRF node to an Application Function (AF) node.

11. The method of claim 9, further comprising sending the message from the PCRF node to a Traffic Detection Function (TDF) node.

12. The method of claim 9, wherein the message comprises a Node-Info-Push message.

13. The method of claim 9, wherein the network apparatus includes a packet data network gateway (PGW), and receives information generated by RANs.

14. The method of claim 13, wherein the network apparatus collects congestion information for multiple UEs over a time period t.

15. The method of claim 13, further comprising determining whether the network apparatus will aggregate the congestion information or provide separate messages for the first and second congestion information.

16. The method of claim 13, further comprising piggybacking the aggregated congestion information onto an existing another message.

17. The method of claim 9, further comprising providing, to the first UE and the second UE by the PDN gateway, connectivity to a plurality of external packet data networks.

18. A method for relieving congestion in a network system, comprising:
   receiving at a Policy Rules Charging Function (PCRF) node, from a Packet Data Network (PDN) gateway, a first message comprising congestion information, wherein the message comprises aggregated congestion information including at least a first indication of congestion information and a second indication of congestion information relating to first and a second user equipment (UE);
   generating a policy enforcement decision to relieve congestion in the network; and
   sending a second message to the PGW, wherein the second message comprises control message for relieving congestion in the network.

19. The method of claim 18, wherein the PCRF forwards the message to an Application Function (AF) node.

20. The method of claim 18, wherein the PCRF forwards the message to a Traffic Detection Function (TDF) node.

21. The method of claim 18, further comprising determining whether to receive congestion information relating to multiple UEs in aggregate form.

* * * * *